United States Patent
Marazzi et al.

(10) Patent No.: US 6,582,527 B2
(45) Date of Patent: Jun. 24, 2003

(54) METHOD FOR REMOVING A COATING FROM A PORTION OF OPTICAL FIBER

(75) Inventors: Marco Marazzi, Pavia (IT); Marco Paese, Bellinzago Novarese (IT); Adina Pircalaboiu, Milan (IT)

(73) Assignee: Corning OTI SpA, Milan (IT)

( * ) Notice: Subject to any disclaimer, the term of this patent is extended or adjusted under 35 U.S.C. 154(b) by 0 days.

(21) Appl. No.: 09/991,194

(22) Filed: Nov. 15, 2001

(65) Prior Publication Data

US 2002/0117190 A1 Aug. 29, 2002

Related U.S. Application Data

(60) Provisional application No. 60/252,098, filed on Nov. 21, 2000.

(30) Foreign Application Priority Data

Nov. 16, 2000 (EP) .............................................. 00124991

(51) Int. Cl.[7] ................................ B08B 1/00; B08B 3/04
(52) U.S. Cl. ................................ 134/42; 134/9; 134/15
(58) Field of Search ................................ 134/9, 15, 42

(56) References Cited

U.S. PATENT DOCUMENTS 5,287,426 A * 2/1994 Shahid ........................ 385/59
5,681,417 A * 10/1997 Jacobs ........................ 118/404
5,766,403 A   6/1998 Go

FOREIGN PATENT DOCUMENTS

| JP | 60162204 | 8/1985 |
|----|----------|--------|
| JP | 02201301 | 8/1990 |
| JP | 10300939 | 11/1998 |

* cited by examiner

Primary Examiner—Zeinab El-Arini
(74) Attorney, Agent, or Firm—Eric M. Smith; James V. Suggs

(57) ABSTRACT

A method for removing a coating (14) from a portion of optical fiber (11) including the steps of mechanically removing the coating (14) from two portions of fiber (16a, 16b) of predetermined length and spaced each other of a predetermined distance, and then immersing the portion of fiber (17) interposed between the two considered portions (16a, 16b) in a liquid solvent (28) so as to chemically remove the coating (14) thereof; the two portions of fiber (16a, 16b) from where the coating (14) has been mechanically removed are held only partially dipped in the liquid solvent (28), so that the liquid solvent (28) is prevented from reaching the portions of the fiber (18a, 18b) outside the liquid solvent (28) by capillary action through the coating.

9 Claims, 2 Drawing Sheets

METHOD FOR REMOVING A COATING FROM A PORTION OF OPTICAL FIBER

This application claims the benefit of priority under 35 U.S.C. § 119 of European Patent Application Ser. No. EP0012499.1 filed on Nov. 16, 2000. This application claims the benefit of priority under 35 U.S.C. § 119(e) of U.S. Provisional Application Serial No. 60/252,098 filed on Nov. 21, 2000.

BACKGROUND OF THE INVENTION

The present invention relates to a method for removing a coating from a portion of optical fiber. In particular, the invention relates to a method for removing an acrylate coating layer from a portion of optical fiber so as to allow splicing, manufacturing of fused-fiber couplers, and writing of Bragg gratings.

As known, optical fibers are largely used in the field of telecommunications for transmitting signals. They essentially comprise an inner cylindrical region, called core, in which the signal is transmitted, and an outer annular region, called cladding, having a lower index of refraction with respect to that of the inner region so as to confine the transmitted signal within the core. Both the above-mentioned regions are usually made of a glass material.

Due to the very small dimensions (typically, 125 $\mu$m) and to the fragile material (glass) of which they are made, optical fibers are intrinsically subject to breaking. For the purpose of ensuring a high mechanical reliability in operation, during the drawing process the fibers are coated with a soft material consisting basically of polymers (typically, acrylate), which has the function of protecting the fiber during handling and from atmospheric agents.

In special applications, such as for example for splicing, manufacturing of fused-fiber couplers, or writing of Bragg grating, the acrylate coating must be removed from the fiber so as to uncover the glass region.

Different methods for removing the acrylate coating from an optical fiber are known; they can be essentially classified into two categories: methods with chemical removal and methods with mechanical removal.

Generally, the methods with mechanical removal provide for the use of mechanical tools or devices that are manually operated by the operator to remove the acrylate layer from the optical fiber. Many kind of tools and devices have been proposed in the past for this purpose.

SUMMARY OF THE INVENTION

The present invention includes a method for removing a coating from a portion of optical fiber. The method includes the steps of mechanically removing the coating from a first fiber portion, the first fiber portion separating a second fiber portion from a third fiber portion; and chemically removing the coating from the second fiber portion. The step of chemically removing the coating includes immersing the second fiber portion into a liquid solvent, and holding the first fiber portion partially out from the liquid solvent, so as to prevent the liquid solvent from reaching the third fiber portion.

DETAILED DESCRIPTION OF THE INVENTION

Figure 1:
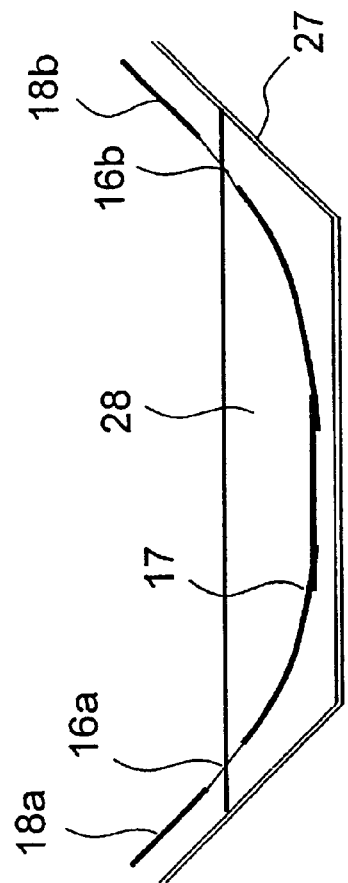
FIG. 1 is a cross-sectional view of an optical fiber.

The simplest tools for removing the coating from an optical fiber are collet-type tools (for example, the tools called "Miller stripper") provided with a pair of cutting blades adapted to cut into the acrylate coating layer of the fiber. The procedure for removing the acrylate is of the manual-type, and consists in positioning a portion of the fiber between the blades of the tool, clamping the tool so as to cut into the acrylate layer and sliding the tool clamped onto the fiber so as to remove the acrylate layer. In order to prevent damage or breaking of the fiber, care must be taken to keep the tool perpendicular to the fiber during the entire operation for removing the acrylate.

The inventors of the present invention have carried out several experimental tests for removing acrylate from optical fibers, using a tool of the above described type (in particular, a Miller stripper) and each time measuring the values of the ultimate tensile strength of the fibers after acrylate removal. They have verified that the results presented low values and strong deviations; in addition, said low values decreased and said deviations increased as the fiber length portion from which the acrylate was removed increased. This was essentially due to the difficulty, for the operator who handled the tool, of repeating the operation at the same speed, always exerting the same force and keeping the same relative position between tool and fiber for the entire predetermined fiber length.

Several other tools or devices for mechanical coating removal are known in the art. The Applicant observes that generally, when a mechanical stripping is performed, acrylate residues remain on the stripped fiber surface, and these residues must be successively removed. One way to remove the residues is manual cleaning by means of lint free towels wet with acetone or alcohol. This manual cleaning may nevertheless cause damages on the fiber surface with a consequent worsening of the product quality.

Chemical removal is usually obtained by dipping a portion of the fiber into a solvent adapted to sink into the coating. A certain time after dipping, the coating swells and can be easily removed. A method with chemical removal usually allows a better cleaning of the fiber surface than a method with mechanical removal.

One proposed method includes dipping a portion of a coated optical fiber into a hot bath of sulphuric acid at about 150° for few minutes; afterwards, the fiber is rinsed into a water bath and then dried through a hot-air jet.

According to a proposed method for removing the silicon coat of an optical fiber, after removal of the secondary coat from the fiber, the area of the fiber where the silicon coat is exposed is dipped in a solvent of aliphatic and aromatic hydrocarbon in a container. Thus the solvent sinks into the coat, and the coat swells to have a deformation. Thereafter, the core wire is picked out of the solvent, and the swelled silicon coat is removed by means of a tool.

In another proposed method for removing the jacket of a coated optical fiber, the length of the part where the jacket is to be removed is first determined and is notched. The fiber is then immersed into a container filled with a swelling solution and a non-swelling solution, in such a manner that the notched part coincides with the boundary of the two liquids in the container. The jackect in the swelling solution swells and is strippable upon lapse of several minutes in this state. Methylene chloride is used for the swelling solution and water is used for the non-swelling solution.

Other techniques are known that include both a mechanical and a chemical action.

One proposed jacket removing device for a coated optical fiber includes a swelling liquid tank which contains swelling liquid, a jacket clamp which clamps an end part of the coated optical fiber almost vertically, a tension spring which gives an upward tensile force to the coated optical fiber by elevating the clamp, and a ultrasonic vibration generating device which gives ultrasonic vibration to the swelling liquid. A cut in a circumferential direction is formed in the outer periphery nearby the end part of the coated fiber in advance and acetone or other solvent is used as the swelling liquid. When the jacket of the fiber dipped in the swelling liquid swells as specified, the adhesive strength to the fiber decreases and the jacket peels. Then the upward tensile force is applied to the coated fiber by the tension spring, so the coated fiber is lifted while the jacket is left in the jacket clamp.

Another proposed method for removing an intermediate part coating of an optical fiber includes forming notches on a skin in the circumferential direction with a circumferential cutter, then sliding a cutting blade along the axial direction, thereby cutting away part of the skin between the notches to expose a part of silicon film outside, then immersing the optical fiber into a solvent, such as alcohol, to remove the skin remaining between the notches completely.

A proposed tool for removing the acrylate coating from an optical fiber includes a hollow cylindrical body adapted to house a portion of the optical fiber. The cylindrical body presents an inlet passage for a stripping fluid adapted to soften and expand the acrylate coating of the fiber. In addition, at one of its ends, the cylindrical body is provided with an annular shoulder disposed at the interior end of the passage and formed by a short cylindrical neck section coaxial with the passage, the shoulder having a diameter only marginally greater than the outer diameter of the coated fiber and smaller than the outer diameter of the fiber when the coating layer of the latter has been softened and expanded by the injected fluid. The acrylate coating is removed by manually pulling the fiber through the shoulder surface after the coating has been softened under the action of the fluid. We remark that said tool is adapted for removing the acrylate coating from an end portion of the fiber for splicing; it is not adapted for Bragg grating, that is to say, when the acrylate coating must be removed from an intermediate fiber portion.

The Applicant has noticed that all the methods previously described present the drawback that, after the fiber has been dipped in the liquid solvent, the liquid solvent can go up the fiber via capillary action, thus swelling and possibly tearing the acrylate coating in a portion of the fiber in which coating removal is undesired. This problem is only partially overcome in the above-described tool thanks to the constriction afforded by the neck relative to the inserted coated fiber, that causes the fluid not to significantly migrate to the coating contained within the neck. The Applicant nevertheless observes that this solution is not sufficient to completely prevent solvent to migrate via capillary action along the fiber. The damaging of the coating due to this phenomenon could imply long term problems of reliability of the fiber due to the penetration of water in the form of humidity.

The Applicant has thus tackled the problem of realizing a suitable method to allow the removal of the acrylate coating from fiber end or intermediate portions having even great lengths to allow splicing, manufacturing of fused-fiber couplers and writing of Bragg grating, carrying out a simple, inexpensive and repeatable method of removal, that prevents liquid solvent from penetrating fiber portions not dipped into the liquid.

The Applicant has found that, by first mechanically removing the coating from two spaced portions of the fiber in order to expose the cladding surface thereof for a substantial length, and subsequently dipping the intermediate portion into a liquid solvent in such a way as to only partially dip the two portion lacking the coating, the coating can be chemically removed from the intermediate portion without having migration of liquid to the portions of fiber outside the liquid. In the same way, the coating can be removed from an end portion of the fiber by first removing the coating from a portion of the fiber upstream the end portion, and then dipping the end portion into the liquid solvent taking care of letting the portion lacking the coating partially outside the liquid solvent, so as to prevent the liquid from penetrating upstream the end portion.

In this way the solvent can act very efficiently for the removal of the coating, mainly because it can directly penetrate into the interface between the glass and the acrylate, through the portions where the coating was previously mechanically removed. The solvent can therefore act from the internal of the acrylate layer, other than from the external of it, and this action produces a rapid swelling of the coating and the longitudinal breaking of it. The number and the size of the acrylate residues on the final glass surface are particularly low. This is a very important advantage, since acrylate residues can affect the quality of the device that is subsequently made. For example, if a Bragg grating is written on the stripped fiber portion, the presence of acrylate residues can produce a distorsion of the optical fringe pattern during the writing process and, therefore, a worsening of the grating quality.

This method allows the coating removal with predictable and repeatable results and guarantees high mechanical reliability of the fibers during operation.

The present invention thus relates to a method for removing a coating from a portion of optical fiber, comprising:
  mechanically removing said coating from a first fiber portion, said first fiber portion separating a second fiber portion from a third fiber portion; and
  chemically removing said coating from said second fiber portion, said step of chemically removing comprising:
    immersing said second fiber portion into a liquid solvent; and
    holding said first fiber portion partially out from the liquid solvent, so as to prevent the liquid solvent to reach said third fiber portion.

Advantageously, said step of chemically removing further comprises:
  mechanically removing said coating from a fourth fiber portion, said fourth portion separating said second fiber portion from a fifth fiber portion; and
  holding said fourth fiber portion at least partially out from the liquid solvent so as to prevent the liquid solvent to reach said fifth fiber portion, when said second fiber portion is immersed into the liquid solvent.

Said first fiber portion has a length preferably of at least 0.5 cm, more preferably of at least 1 cm and said second fiber portion has a length preferably of at least 1 cm, more preferably of at least 5 cm.

Said liquid solvent is preferably a chlorinated substance, a ketone or a hydrocarbon substance.

Further features and advantages of the present invention will appear more clearly from the following detailed description of some preferred embodiments, made with reference to the attached drawings. In such drawings:

In FIG. 1, numeral reference 11 indicates an optical fiber including a glass core 12, a glass cladding 13 surrounding the glass core 12, and an acrylate coating 14 surrounding the cladding 13. Coating 14 can include one or more distinguishable layers made of acrylate, for example it can include a primary coating surrounding the cladding 13 and a secondary coating surrounding the primary coating. For aim of simplicity, only one coating layer will be considered in the following, since the technique of the present invention has no dependency on the number and the thickness of the coating layers.

Fiber 11 can be made by any of the different techniques for the manufacturing of optical fibers known in the art.

When fiber 11 is to be used for making up a fiber splicing, a fused-fiber coupler, or a Bragg grating, the acrylate coating must be removed from the fiber so as to uncover the glass region and to obtain a clean glass surface.

The technique of the present invention can be applied for the removal of the coating from an intermediate portion of the fiber or from an end portion of the fiber.

In the following, the portion of the fiber from which the coating has to be chemically removed will be indicated as "removal portion". Therefore, the removal portion can be an intermediate portion of the fiber such as, for example, for the manufacturing of fused-fiber couplers or Bragg gratings, or an end portion of the fiber such as for the manufacturing of fiber splices.

The technique of the present invention includes, as extensively described below, a first step of mechanically removing the coating from at least one portion of the fiber delimiting the removal portion, followed by a second step of chemically removing the coating from the removal portion by dipping this portion into a solvent bath. This at least one portion where the coating is mechanical removed will hereinbelow indicated as "boundary portion" in that it delimits the removal portion. In the case of an end removal portion, there is one boundary portion that delimits upstream the removal portion. In the case of an intermediate removal portion, the are two boundary portions that delimit the removal portion on opposite sides.

The technique of the present invention includes, as extensively described below, a first step of mechanically removing the coating from at least one portion of the fiber delimiting the removal portion, followed by a second step of chemically removing the coating from the removal portion by dipping this portion into a solvent bath. This at least one portion where the coating is mechanical removed will hereinbelow indicated as "boundary portion" in that it delimits the removal portion. In the case of an end removal portion, there is one boundary portion that delimits upstream the removal portion. In the case of an intermediate removal portion, there are two boundary portions that delimit the removal portion on opposite sides.

In the second step, in the case of an intermediate removal portion, the removal portion is dipped in the solvent while the boundary portions are held partially dipped, in order to have a substantial part of them out of the liquid. In this way, the liquid solvent is prevented from going up the fiber via capillary action due to the absence of acrylate in the boundary portions, and the coating of the isolated portions will not be degraded. The same occurs in the case of an end removal portion, if the removal portion is dipped in the solvent while the single boundary portion is only partially dipped. Therefore, each boundary portion separates the removal portion from a portion of the fiber that, due to presence of the corresponding boundary portion, is isolated from the solvent during the second step and will therefore be indicated as an "isolated portion".

Figure 2:
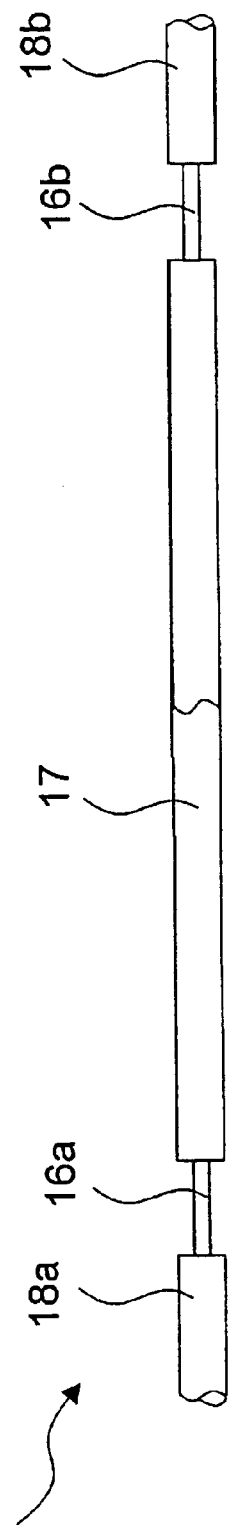
FIG. 2 is a longitudinal view of a span of optical fiber after the step of mechanical removal and before the step of chemical removal.

FIG. 2 shows schematically a span of fiber 11 at the end of the first step. Fiber 11 includes an intermediate removal portion 17, a first boundary portion 16a that separates the removal portion 17 from a first isolated portion 18a and a second boundary portion 16b that separates the removal portion 17 from a second isolated portion 18b.

The boundary portions 16a, 16b are spaced of a predetermined distance L and have a predetermined length l. The distance L depends on the extension of the removal portion 17. For example, for writing a long period Bragg grating, a removal portion 17 long up to 1 m or more can be required, while for fused fiber coupling the removal portion 17 can be much shorter. As a general rule, the length of the removal region 17 is preferably at least 5 cm in the case of an intermediate portion and 1 cm in the case of an end portion.

The length l depends both on the distance L and on the kind of solvent used for chemically removing the coating from the removal portion 17 according to the method hereinafter described. The length l must be sufficient to prevent solvent from reaching the first and the second isolated portions 18a, 18b, when the removal portion 17 is dipped into the solvent and the boundary portions 16a, 16b are partially dipped. In this case, the solvent cannot go up the fiber along the glass surface, so the first and the second isolated portions 18a, 18b remain dry.

In choosing the length l, another effect must be taken into consideration. When the removal portion 17 is dipped into the liquid solvent, the coating tends not only to swell, but also to expand longitudinally. As a consequence, the borders of the coating of the removal portion 17 tend to approach the borders of the coating of the first and the second isolated portions 18a, 18b. This effect is not particularly relevant when fast-action solvents like methylene chloride are used, because in this case the coating tears before being significantly expanded in the longitudinal sense. Therefore, in general, the boundary portions 16a, 16b must be sufficiently long to perform the said isolating function even after the coating of the removal portion 17 has longitudinally expanded.

The length l is preferably at least 0.5 cm, more preferably at least 1 cm, and can be of a few centimetres (for example 2.5 cm) when the removal portion 17 is longer than a few tenths of a centimetre.

The mechanical removal of the coating from each boundary portion can be performed by any technique known in the art. For example, the coating removal may be performed by a manual tool such as the one known as Miller stripper.

The Applicant has developed an apparatus that is particularly suitable for removing a coating layer of acrylate from a portion of optical fiber. Said apparatus is hereinbelow described with reference to FIG. 3, where it is globally indicated with 1.

Apparatus 1 comprises a support frame 2 provided with a support base 3, a plurality of uprights, all referred to with numeral 4, and a crosspiece 5 for supporting most of the structural components of the apparatus itself. Crosspiece 5 is connected to the support base 3 through uprights 4.

A pair of fiber-positioning devices 6a, 6b are mounted on the crosspiece 5 of the frame 2 in correspondence with its opposing ends 5a, 5b. Devices 6a, 6b are adapted to house opposing end parts of a portion 100 of optical fiber, so as to hold the latter in a substantially stretched position along a substantially horizontal fiber alignment axis X—X.

The fiber-positioning devices 6a, 6b are arranged on the crosspiece 5 of the frame 2 at opposed sides with respect to a tool 200 adapted for removing the coating layer of acrylate from a portion having a fixed length (from few cm to 1 metre or more) of the portion 100 of optical fiber.

Each fiber-positioning device 6a, 6b comprises a clamping element 7a, 7b for clamping one of the end parts of the portion 100 of optical fiber, and a device 8a, 8b for horizontally and vertically adjusting the position of the clamping element 7a, 7b on the frame.

Clamping elements 7a, 7b and adjusting devices 8a, 8b are both of a conventional type.

Each clamping element 7a, 7b is mounted on a support plate 9a, 9b connected, on the upper part, to the adjusting device 8a, 8b. The position of the clamping element 7a, 7b on the frame 2 (in horizontal and vertical direction) is adjusted by the operator who operates on driving means (in the specific case, knobs 10) associated to each device 8a, 8b. In particular, the rotation of each knob 10 causes the vertical movement of the respective plate 9a, 9b and thus, of the clamping element 7a, 7b associated to it.

In turn, each clamping element 7a, 7b comprises a base body 71a, 71b and an upper body 72a, 72b adapted to reciprocally co-operate so as to hold one of the end parts of portion 100 of optical fiber into position. The base body 71a, 71b and the upper body 72a, 72b are reciprocally connected by a support arm 73a, 73b.

The base body 71a, 71b is integrally mounted on the plate 9a, 9b, and in its upper part it is provided with a V-groove (or with a groove having similar shape) adapted to house the end part of the portion 100 of optical fiber. The upper body 72a, 72b is connected to the support arm 73a, 73b by a threaded screw (not visible) which, at an upper end, is provided with a hand grip 74a, 74b for controlling the rotation; by rotating said hand grip the upper body 72a, 72b moves in vertical direction, moving closer to, or away from, the base body 71a, 71b.

A Teflon element (non shown) is connected to the upper body 72a, 72b, and is intended to be at least partly housed into the V-groove of the base body 71a, 71b to hold the end part of the portion 100 of optical fiber into position.

A pair of fiber-collecting coils 75a, 75b and a pair of further fiber-clamping elements 76a, 76b, positioned on the support plate 9a, 9b, contribute to obtain the desired tensioning degree of the portion 100 of optical fiber before the acrylate is removed.

Additionally, apparatus 1 comprises a moving device 20 adapted to impart a relative motion between the portion 100 of the fiber and the tool 200 along the fiber alignment axis X—X.

In particular, the moving device comprises a slide 21 (of a conventional type), which slides along a rack 22 (also conventional) connected to the crosspiece 5. A motor 23 is active on the slide 21 to automatically impart to the latter a controlled motion (preferably with a constant speed, for example of 50 mm/min) in parallel with the fiber alignment axis X—X.

Tool 200 is integrally mounted on a support arm 30 which overhangs from a plate 31 integral with the slide 21. Thus, the portion 100 of fiber is fixedly positioned onto the apparatus 1, while tool 200 automatically moves in parallel with the axis X—X of the fiber with controlled motion.

In an alternative embodiment (not shown) of the apparatus of the present invention, the tool 200 is fixedly mounted onto the frame 2 of the apparatus 1, while the fiber moves along axis X—X. In this type of embodiment, the coil 75a for collecting and/or winding the fiber is rotatably mounted on the frame 2, and it is driven by suitable motor means around a vertical rotation axis perpendicular to axis X—X. On the contrary, coil 75b, positioned on the support plate 5 at an opposed side of the collecting coil 75a with respect to tool 200 serves as fiber-unwinding coil; it is also rotatably mounted on the support plate 5, and it is pulled in rotation by the fiber-collecting coil 75a, which pulls the fiber. Of course, the function of the two coils 75a and 75b can be reversed, that is to say, coil 75a can operate as winding coil and coil 75b as unwinding coil; in addition, both coils 75a, 75b can be motorised so as to rotate into the same direction and at the same speed.

Tool 200 is preferably of the stripper type, and it comprises a first and a second arm, respectively referred to with numerals 201, 202, reciprocally pivoted. In correspondence with respective end portions thereof, both arms 201 and 202 are provided with cutting blades, respectively referred to with numerals 203 and 204, active on a plane YZ perpendicular to the fiber alignment axis X—X, and adapted to cut into the acrylate layer of the portion 100 of optical fiber.

Blades 203, 204 are provided respectively with preferably V-shaped (or U-shaped, or semicircular) grooves adapted to co-operate for removing the acrylate.

The first arm 201 of the tool 200 is connected to the support arm 30 and it is positioned perpendicularly to the fiber alignment axis X—X. The V-groove of the respective blade 203 is perfectly aligned with the V-grooves of the clamping elements 7a, 7b of the fiber-positioning devices 6a, 6b. In the initial configuration, the V-groove of blade 203 of the first arm 201 houses an intermediate part of the portion 100 of optical fiber.

The second arm 202 (and thus, the blade 204) is movable in the plane YZ between a first operating position, wherein the respective blade 204 is in a distal position with respect to the portion 100 of optical fiber, and a second operating position wherein also blade 204 houses a portion of the portion 100 of optical fiber into its V-groove, and co-operates with blade 203 of the other arm to cut into the acrylate layer. In this second position, also the movable blade 203 is perfectly perpendicular to the axis X—X of the optical fiber.

A counter spring 205 is active between arms 201 and 202, adapted to hold the two blades 203 and 204 into a spaced position from one another when at rest.

In the preferred embodiment of apparatus 1 of the present invention, tool 1 is a conventional Miller Stripper, available on the market, for example, at Advanced Custom Applications, Inc.—Belle Mead, N.J., USA.

Apparatus 1 comprises a preferably pneumatic device 50 active on the movable arm 202 of tool 200 to automatically move by a controlled motion (preferably at a constant speed) blade 204 from the first to the second operating position. Said pneumatic device is driven by the operator by means of a lever distributor 60 (of a conventional type) mounted on frame 2 of apparatus 1.

In particular, the pneumatic device 50 comprises a pneumatic cylinder 51 inside which slides a piston that, when device 50 is activated, drives the movement of the movable arm 202 of tool 200 (and thus, of the blade 204).

The pneumatic connection between the lever distributor 60 and the pneumatic cylinder 51 is obtained through a tube 62.

Piston 52 is adapted to push the second arm 202 of tool 200 from the bottom upwards, outweighing the resistance exerted by the counter spring 205, when the pneumatic device 50 is activated. In particular, the piston 52 presents, in correspondence with one end, a roller 53 which is in contact with the second arm 202 in the proximity of its free end opposed to the end wherein blade 204 is provided. In this type of embodiment, the operation of the pneumatic device 50 causes the pressure inside cylinder 51 to increase, thus pushing piston 52 outwards.

Nevertheless, it is possible to use other types of conventional devices to automatically move the tool from the first to the second operating position; for example, it is possible to use mechanical (with worm screw), magnetic (with solenoid), electromechanical devices, etc.

In an embodiment not shown, the apparatus of the present invention comprises a device integrally mounted on tool 200 for emitting an air jet and adapted to impact over the fiber so as to blow away the acrylate just removed.

Apparatus 1 of the present invention has been described and illustrated in the embodiment with a horizontal fiber alignment axis X—X. However, what has been said above is applicable also in the case the apparatus is realised with a vertical axis X—X.

During operation, apparatus 1 has an initial configuration in which tool 200 is positioned perpendicularly to fiber alignment axis X—X, with the blades into the first operating position (tool in open configuration).

The portion 100 of optical fiber is positioned onto the apparatus 1 by housing the end parts of the fiber portion 100 into the V-grooves of the base bodies 71a, 71b of the clamping elements 7a, 7b of fiber-positioning devices 6a, 6b, and aligning the portion 100 of optical fiber with the V-groove of the fixed blade 203 of tool 200. The alignment can be obtained by vertically and/or horizontally moving the clamping elements 7a, 7b by the devices 8a, 8b.

Through the hand grips 74a, 74b, the upper bodies 72a, 72b are moved downwards so as to clamp the end parts of the fiber portion 100 into the clamping elements 7a, 7b.

Then, the lever distributor 60 of the pneumatic device 50 is actuated; in this way, the closing of the movable arm 202 of tool 200 is activated, so that blade 204 is moved from the first to the second operating position. In this position, both blades 203 and 204 are exactly perpendicular to the portion 100 of optical fiber.

Afterwards, the motor means 23 controlling the movement of slide 21 are activated. The movement of tool 200 causes the acrylate to be evenly removed from a length l of fiber, so as to obtain a first one of the boundary portions, for example boundary portion 16a. At this stage, it is possible to actuate at the same time the device for emitting the air jet so as to facilitate the removal of the acrylate from the fiber.

Once the length l has been reached, the slide 21 is stopped by disactivating the motor 23. By actuating the lever distributor 60, the movable arm 202 of tool 200 is moved back to its first opening position.

In order to obtain the second boundary portion 16b, slide 21 can be moved of the distance L, by activating the motor 23. Alternatively, if the distance L is greater than the movement range of slide 21, fiber 11 can be repositioned in order to have a new portion 100 of optical fiber within the movement range. The coating is then removed from a portion of length l, in the same way as before, so as to obtain the second boundary portion 16b.

Finally, the lever distributor 60 is newly actuated so as to move back the movable arm 202 of tool 200 to its first opening position, and to remove the fiber from the positioning devices 6a, 6b.

The fiber is now ready for the following step of the method of the present invention, i.e. for the chemical removal of the coating from the removal region 17.

Figure 4:
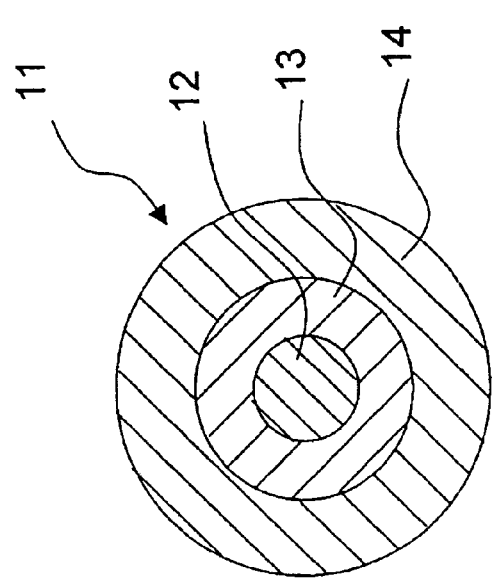
FIG. 4 is a schematic view of an arrangement for the chemical removal of the fiber coating.

The chemical removal of the acrylate coating is performed as shown in FIG. 4.

A basin 27 filled with a liquid solvent 28 is used. The liquid solvent 28 may be a chlorinated substance (like methylene chloride, chloroform or methyl chloride), a ketone (like acetone or methylethylketone) or, possibly, a hydrocarbon. In general, every substance can be used that is able to penetrate the molecular structure of the acrylate and to swell it, preferably without altering the physical nature of the material, i.e. without decomposing it into solution; the same substance should be able to seep between the cladding glass surface and the acrylate, without chemically interacting with glass.

Basin 27 must be of a material that does not react with the liquid solvent 28, for example stainless steel. A hood is preferably provided over the basin 27 for protecting the operators from liquid solvent vapor.

According to the present invention, the fiber is dipped into the basin 27, taking care of disposing the removal portion 17 completely within the liquid solvent 28 and maintaining the boundary portions 16a, 16b only partially dipped, as illustrated in FIG. 4. In particular, it is important that a significant part of the boundary portions 16a, 16b is outside the liquid solvent 28, in order to prevent the liquid solvent 28 from reaching the isolated portions 18a, 18b through surface adhesion. In the case of an end removal portion, the removal portion is dipped into the liquid solvent and the single boundary portion is maintained partially dipped.

Figure 3:
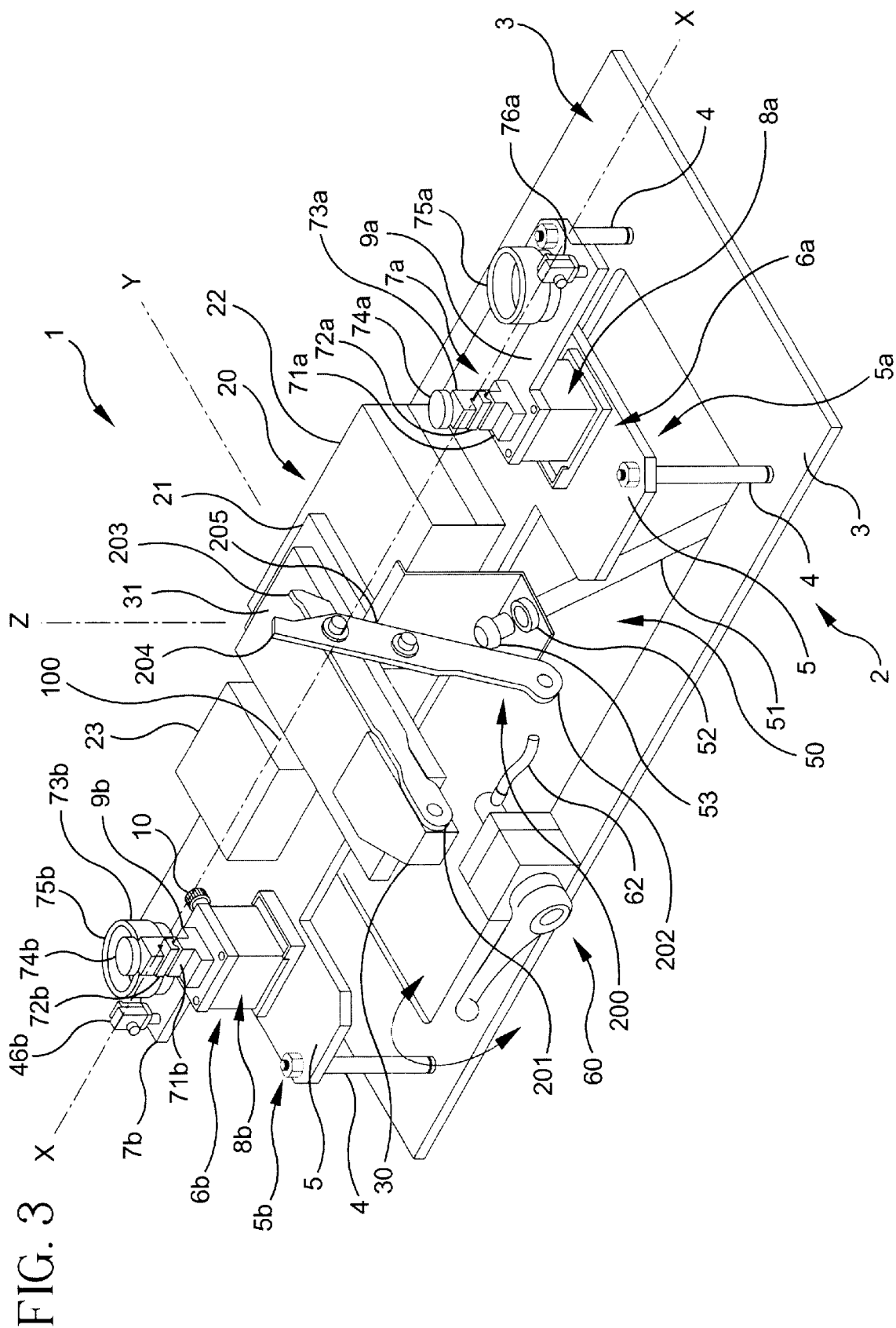
FIG. 3 shows a perspective schematic view of an apparatus used to mechanically remove the fiber coating.

The fiber can be held, for example, by bodies provided with V-grooves, as in the apparatus of FIG. 3. These bodies can be positioned on opposite parts of basin 27 and be inclined so as to allow the fiber to assume the desired curvature. Moreover, these bodies must hold the fiber so as to avoid any contact between the dipped portion of the fiber and the internal wall of the basin 27.

The liquid solvent 28 acts by soaking the acrylate coating and softening it, so as to cause it to loose its adherence to the underlying glass material. The coating starts detaching from the borders of the boundary portions 16a, 16b, where the solvent penetrates directly between the fiber cladding and the internal acrylate coating, increasing the swelling effect. Then the solvent liquid 28 migrates by capillary action towards the center of the removal portion 17, and the coating progressively swells and detaches from glass, typically after a longitudinal split has formed along the coating.

The complete detachment of the coating is reached after a time that depends on the type of solvent used. The lower is molecule dimension of solvent, the faster is the stripping process. For example, methylethylketone requires approximately 10 minutes to provide the complete detachment of the coating from a length of fiber of at least 5 cm, while dichloromethane, whose molecules are smaller that those of methylethylketone, requires only a few minutes.

By observing the detached coating by electronic microscope (SEM), the Applicant noticed that the coating shows a cut for its entire length, but it is not deteriorated or worn. The same analysis on the cleaned fiber surface has demonstrated that the number of acrylate residues is particularly low, in particular only four acrylate particles having an average size of 1 gm have been detected on a 30 mm long surface portion. The Applicant has performed the same analysis on another fiber portion of the same length where the coating was removed by a Miller Stripper and the surface was cleaned by lint free towels soaked with acetone, and has noticed that in this last case ten particles having an average size of 15 $\mu$m were present on the surface. If $\rho$ is the product between the number of particles and their average diameter, and $\eta$ the ratio between $\rho$ and the length of the considered fiber portion, the method of the present invention provides approximately $\eta=1.33\cdot10^{-4}$, while the other technique mentioned above provides approximately $\eta=5\cdot10^{-3}$. Therefore, a higher level of cleaning can be obtained, and a value of $\eta$ lower than $5\cdot10^{-3}$, in particular lower than $1\cdot10^{-3}$, can be reached.

Another advantage of the above described cleaning method is that, since it makes use of a volatile solvent, it does not require to rinse the cleaned surface by water and to subsequently dry it, as usually required by other cleaning methods with chemical action that use non-volatile solvents.

After terminating the chemical removal, the fiber is ready for the following step of the production cycle, i.e. for the Bragg grating writing, for the fiber splicing or for the fiber coupling.

EXPERIMENTS

The inventors of the present invention have carried out several experimental tests on optical fibers in different operating situations, by measuring every time the values of ultimate tensile strength of the fibers.

Measures were taken on:
1) fiber as produced ("pristine fiber");
2) fiber after mechanical stripping; in particular, after mechanical removal of the acrylate coating from a removal portion 2.5 cm wide by the apparatus of FIG. 3 (provided with a Miller Stripper), and manual cleaning of the stripped fiber surface by means of lint free towels soaked with acetone; and
3) fiber after stripping with the method of the present invention; in particular, after mechanical removal of the acrylate from the boundary portions for 2 cm at a distance of 6 cm, and subsequent chemical stripping by dipping of the removal portion in a bath of dichloromethane for 10 minutes.

The fibers used were standard single-mode fibers produced by Pirelli S.p.A. The measurements of ultimate tensile strength were carried out with a conventional tensioning machine at a speed of 500 mm/min. Tests were performed on 20 samples of pristine fiber, 20 samples of fiber subjected to mechanical stripping and 50 samples of fiber stripped by the method of the present invention. The results of the tests are shown in table 1.

TABLE 1

| | Ultimate tensile strength | |
|---|---|---|
| | Mean value [g] | Mean standard deviation* [g] |
| Fiber as produced | 7097 | 91 |
| Mechanical stripping | 1081 | 313 |
| Invention | 6001 | 874 |

(*The mean standard deviation of N measures of a quantity x is defined as $\sigma_{\bar{x}} = \sigma_x/\sqrt{N}$, where $\sigma x$ is the standard deviation of quantity x.)

The results of table 1 show that while the mechanical removal of acrylate from a fiber (inclusive of the standard cleaning by lint free towels soaked with acetone) for a few cm-long portion causes a degradation of the ultimate tensile strengths of the fiber from approximately 7 kg to approximately 1 kg, the method of the present invention produces a degradation only to approximately 6 kg, i.e. close to the ultimate tensile strengths of the fiber as produced.

Thus, the apparatus of the invention advantageously allows obtaining a limitation of the mechanical stresses on the fibers and, as a consequence, a high mechanical reliability of the fibers themselves during operation.

An analysis of the fiber surface made by electronic microscopy (SEM) on a fiber stripped by the mechanical technique and on a fiber stripped by the method of the present invention has confirmed that the number of acrylate residues is much lower using the method of the present invention.

Although the present invention has been described in terms of specific exemplary embodiments, it will be appreciated that various modifications and alterations might be made by those skilled in the art without departing from the spirit and scope of the invention as set forth in the following claims.

For example, the liquid solvent can be an acid, such as sulfuric acid ($H_2SO_4$), which causes the direct dissolution of the acrylate.

We claim:

1. A method for removing a coating from a portion of optical fiber, the optical fiber including a first fiber portion, a second fiber portion, and a third fiber portion, the first fiber portion separating the second fiber portion from the third fiber portion, the method comprising the steps of:

mechanically removing said coating from said first fiber portion, thereby forming a stripped first fiber portion; and chemically removing said coating from said second fiber portion, said step of chemically removing said coating from said second fiber portion comprising the steps of:
   immersing said second fiber portion into a liquid solvent; and
   holding said stripped first fiber portion partially out of the liquid solvent, thereby preventing the liquid solvent from reaching said third fiber portion.

2. The method according to claim 1, wherein the optical fiber further comprises a fourth fiber portion and a fifth fiber portion, the fourth fiber portion separating the second fiber portion from the fifth fiber portion, and wherein the method further comprises the step of mechanically removing said coating from said fourth fiber portion, thereby forming a stripped fourth fiber portion, and wherein said step of chemically removing said coating from said second fiber portion further comprises the step of:

holding said stripped fourth fiber portion at least partially out of the liquid solvent, thereby preventing the liquid solvent from reaching said fifth fiber portion when said second fiber portion is immersed in the liquid solvent.

3. The method according to claim 1, wherein said stripped first fiber portion has a length of at least 0.5 cm.

4. The method according to claim 3, wherein said stripped first fiber portion has a length of at least 1 cm.

5. The method according to claim 1, wherein said second fiber portion has a length of at least 1 cm.

6. The method according to claim 5, wherein said second fiber portion has a length of at least 5 cm.

7. The method according to claim 1, wherein said liquid solvent is a chlorinated substance.

8. The method according to claim 1, wherein said liquid solvent is a ketone.

9. The method according to claim 1, wherein said liquid solvent is a hydrocarbon substance.

* * * * *